United States Patent [19]

Benson et al.

[11] 4,171,264
[45] Oct. 16, 1979

[54] METHOD FOR CONTINUOUSLY SEPARATING EMULSIONS

[75] Inventors: Arnold M. Benson; James E. Heath; Mark A. Matovich, all of Houston, Tex.

[73] Assignee: Shell Oil Company, Houston, Tex.

[21] Appl. No.: 801,126

[22] Filed: May 27, 1977

Related U.S. Application Data

[63] Continuation of Ser. No. 587,502, Jun. 16, 1975, abandoned.

[51] Int. Cl.$^2$ ............................................. B01D 19/00
[52] U.S. Cl. ....................................... 210/40; 252/361
[58] Field of Search ............... 210/49, 20, 23, DIG. 5, 210/30 A, 36, 40, 41, 60, 74, 80, 84, 409; 252/361

[56] References Cited

U.S. PATENT DOCUMENTS

| 3,869,408 | 3/1975 | Herce et al. | 252/361 |
| 4,017,389 | 4/1977 | Heath et al. | 252/361 X |

Primary Examiner—Frank A. Spear, Jr.

[57] ABSTRACT

A method and an apparatus for continuously separating disperse phase and a continuous phase from a liquid-liquid emulsion. The emulsion, such as an oil-water emulsion, is flowed into a contacting zone in which the emulsion is agitated with continuous phase wet, disperse phase coalescing, length-classified chemically-pulped cellulose fibers and separated into a disperse phase and a continuous phase which are separately withdrawn.

3 Claims, 1 Drawing Figure

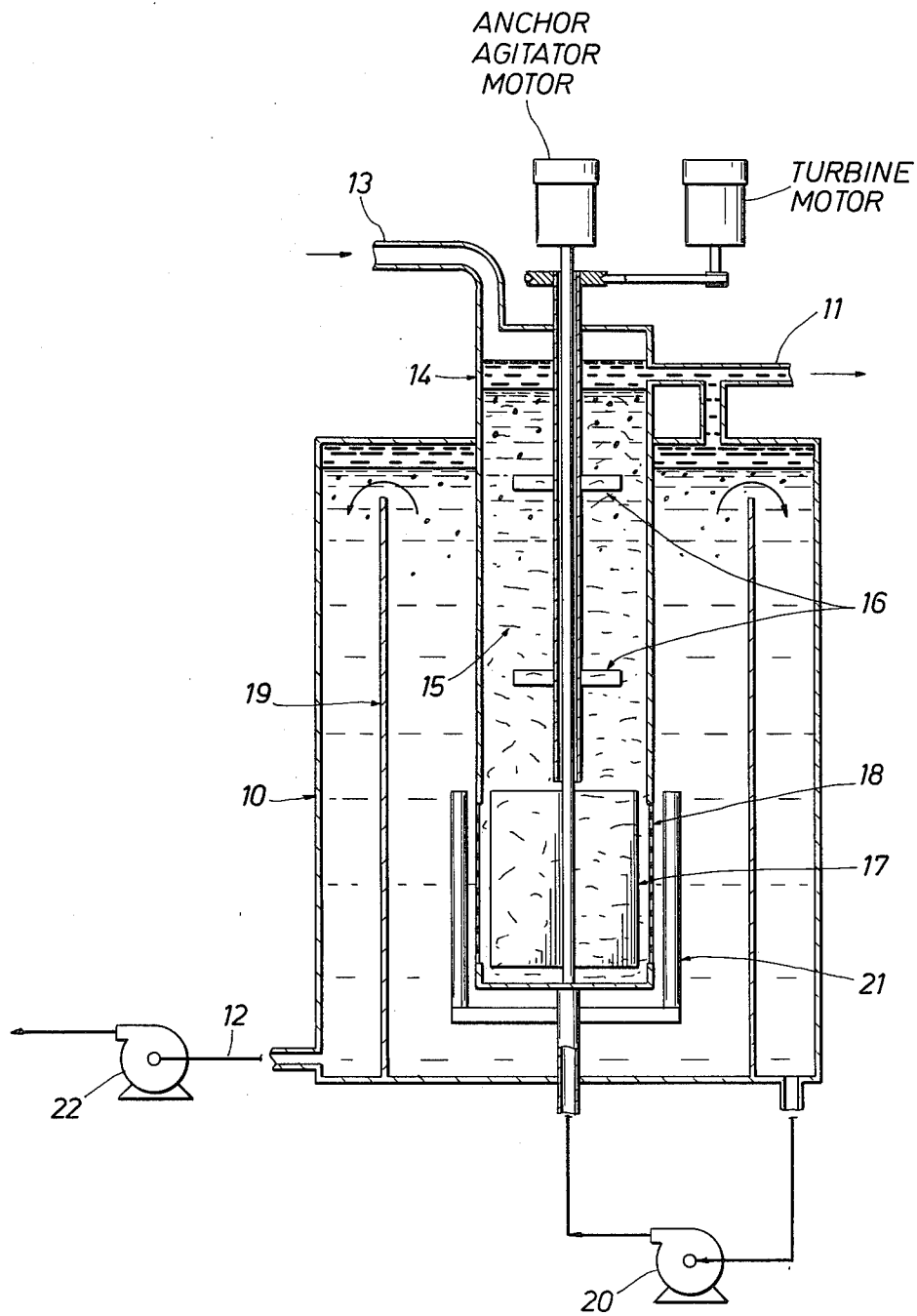

METHOD FOR CONTINUOUSLY SEPARATING EMULSIONS

This is a continuation of application Ser. No. 587,502, filed June 16, 1975, now abandoned.

REFERENCE TO RELATED APPLICATION

This invention is an improvement of the invention disclosed in Herce et al, Application Ser. No. 271,441, filed July 13, 1972, and now U.S. Pat. No. 3,869,408, the disclosure of which being herewith incorporated.

BACKGROUND OF THE INVENTION

1. Field of the Invention

This invention pertains to breaking emulsions and more particularly to a method and an apparatus for treating oil-in-water emulsions to separate oil and water therefrom.

2. Description of the Prior Art

The removal of oil from industrial waste waters is a problem of major curent interest, particularly in the petroleum industry. Oil field produced waters, tanker ballast liquids, and refinery effluents are examples of liquids which may contain oil-water mixtures. The oil contained in such mixtures may be of significant value if separated and recovered. Additionally, and in some cases more importantly, if the oil is removed from the mixture, the water phase may be returned to natural streams, lakes, or oceans. This can save substantial and significant expenses required to dispose of oil-containing water by alternate means.

Exemplary methods and apparatus employed to break oil-in-water emulsions are described in U.S. Pat. Nos. 1,887,774; 3,405,059; 3,152,196; 705,253; 3,147,216 and 3,580,844. None of these prior art inventions has been entirely effective to date in all applications.

SUMMARY OF THE INVENTION

The present invention relates to a method for separating the phases of a liquid-liquid emulsion having a continuous phase and a disperse phase by contacting the emulsion with a continuous-phase wet, disperse-phase trapping, length-classified chemically pulped cellulose pulp (hereafter referred to as classified chemical pulp) suspended in a liquid, and separately withdrawing continuous phase and disperse phase.

The present invention further encompasses an apparatus for continuously separating the phases of a liquid-liquid emulsion having a continuous phase and a disperse phase which includes a vessel, a suspension of classified chemical pulp in a chamber within the vessel; agitating means for agitating the suspension of pulp in the chamber; means for admitting emulsion into the chamber; means for withdrawing a disperse phase from the top of the chamber and the top of the vessel; and means for withdrawing a continuous phase from below the top of the chamber.

The apparatus may include a classified chemical pulp filter at the bottom of the chamber within the vessel which coalesces the disperse phase drawn therethrough and into the vessel, whereby disperse phase floats to the top of the vessel for withdrawal along with disperse phase at the top of the chamber.

BRIEF DESCRIPTION OF THE DRAWINGS

A schematic diagram of the apparatus in cross section is shown.

DESCRIPTION OF A PREFERRED EMBODIMENT

Referring to the drawings, a contacting vessel 10 suitable for use in separating the phases of an emulsion according to the method of this invention is shown. The vessel is provided with an oil or disperse phase effluent outlet 11 near the top thereof and a clean brine, aqueous or continuous phase effluent outlet 12 near the bottom thereof. Oily brine or liquid-liquid emulsion influent 13 is admitted to an internal contacting chamber 14 located within vessel 10. Chamber 14 is loaded with a suspension of a classified chemical pulp 15. The pulp causes coalescing of the disperse phase of the liquid-liquid emulsion, and much of the disperse phase, e.g. oil, floats to the top of this chamber. Turbine impellers 16 furnish continuous agitation of the liquid suspension in chamber 14. Further agitation is provided by anchor agitator 17 which is adjacent annular screen 18. As influent 13 is added to chamber 14, liquid flow passes through annular screen 18 under the influence of suction from effluent pump 22 causing collection of some of pulp fibers 15 on annular screen 18 in the form of a disperse phase coalescing filter cake. This is a second and final stage for breaking the emulsion, and the resulting two phase mixture coming out of the filter flow into and upwardly in vessel 10 and over annular baffle 19. The disperse phase such as oil collects at the top of vessel 10 and is withdrawn along with disperse phase from the top of chamber 14. The continuous phase such as water or brine circulates to be withdrawn as effluent 12 under the influence of effluent pump 22. Backwash pump 20 operatively connecting with rotatable backwash arms 21 provides for periodic removal and/or washing and/or regeneration of collected pulp fibers on annular screen 18. Means not shown herein but described in patent application Ser. No. 271,441, which disclosure is herewith incorporated, is provided for removing collected particulate solids such as sand from chamber 14. This apparatus is preferred for practice with the method of the invention but is susceptible to reasonable change and still be within the scope of the invention.

The primary improvement of the present invention over that disclosed in Herce et al, application Ser. No. 271,441, resides in the use of a classified chemical pulp for the continuous-phase wet, disperse phase coalescing fibers. There is a tendency in the Herce et al apparatus for the cellulose slurry to separate into a "fines" rich filter cake of low permeability and a "log" rich slurry. Ordinary newspaper pulp, or groundwood pulp, the preferred fibrous material in the Herce et al invention, is essentially composed of two different-sized fibers, "logs", and "fines". Logs are, in general, relatively smooth cylinders of wood cellulose. These logs average about 600 microns in length with diameters of about 20 microns. Fines are much smaller; these microfibers are approximately one micron in diameter and range from about 10 to about 30 microns in length. Fines, which are believed to be shredded pieces of the outer layer of the wood fiber, are a product of the grinding stage in the paper pulp production process. Fines contribute appreciably to reduced filtration performance of paper slurries as measured by the higher pressure drop across the filter cake.

Chemical pulp performs better with the apparatus of the present invention than groundwood pulp. Logs in chemical pulp are about the same dimensions as logs in groundwood pulp, but fines fraction does not exist. The "debris" in a chemical pulp is mainly composed of short (20–50 micron) log fragments or chips. Chemical pulping is conducted by dissolving the lignin in wood with various chemical reagents, thus, leaving undamaged most of the fibers and resulting in maximum fiber length and minimum debris. Such pulp lends itself to longer operation with the present apparatus with lower pressure drop than does groundwood pulp. Nonetheless, pressure drop will eventually reach a level requiring shutdown of the apparatus.

Classified chemical pulp is chemical pulp with log chips removed. The classification technique involves use of equipment similar to the standard Baur-McNett and Clark Classifiers widely used in the pulp industry. What remains after classification is long, whole fibers with substantially no apparent kinks or twists. All "hairs" and debris are eliminated and the remaining fibers have diameters of about 10 to 20 and preferably 20 microns or greater, and minimum lengths of about 50 to 100 and preferably 100 microns. This pulp allows achievement of two principal goals—higher flow rate and reduced pressure drop across the filter. Lower flow rates actually are unsatisfactory with the classified chemical pulp since the apparent looseness of the filter cake allows passage of small oil droplets without contacting a pulp fiber. Oddly, lower flow rates require the presence of fines and chips to make the filter more dense and prevent passage of uncontacted oil droplets, but the fines and chips also steadily increase pressure drop and contribute appreciably to poorer filtration performance. Preferred concentrations of classified chemical pulp within the contacting zone range from about 1,000 to about 5,000 ppm at flow rates thru the filter of from about 5 gpm/$f^2$ to about 15 gpm/$f^2$. Among available pulps such as softwood, hardwood, bagasse, etc., hardwood such as fully bleached southern hardwood containing 50–60 percent oak is especially preferred.

Having thus described the invention, the following example is presented as illustrative thereof:

Using the apparatus shown in the drawing, experiments were performed with three pulps—newsprint, unclassified chemical pulp, and classified chemical pulp. Newsprint pulp was made by grinding newspaper in a Waring blender, while the chemical pulp was a fully bleached southern hardwood obtained from a pulp mill. In all cases, pulp concentration in the chamber was 2500 ppm, oil content of the influent brine (10% weight NaCl) was 500 ppm, the influent dispersion was generated using a centrifugal pump, the turbine and anchor agitator rpm's were 80 and 60, respectively, and the annular filter screen was 325 mesh stainless steel. Acceptable operation is defined as production of effluent levels less than 10 ppm oil, and operation extending continuously over several days before effluent quality deteriorates. With newsprint pulp, acceptable operation was only obtained at very low flow rates through the annular filter (0.1 gpm/$f^2$). At higher flow rates pressure drop across the filter rapidly becomes so large (e.g. greater than 5–6 inches $H_g$), that emulsion comes through the filter and effluent quality rapidly deteriorates. Unclassified chemical pulp operates acceptably in the range of 0.5 to 1.0 gpm/$f^2$, whereas classified chemical pulp allows acceptable operation at 10 gpm/$f^2$. Thus use of classified chemical pulp reduces the necessary filter area by a factor of 10 over that required by unclassified chemical pulp, and by a factor of 100 over that required by newsprint.

I claim as my invention:

1. A process for separating the phases of a liquid-liquid emulsion of 30 to 5000 ppm of a disperse phase of oil in a continuous phase of saline water, comprising, contacting the emulsion with from about 1000 to about 5000 ppm of length-classified, chemically-pulped cellulose of fibers having a minimum length of about 50 to 100 microns, and separately withdrawing oil and water.

2. The process of claim 1 wherein the cellulose is a fully bleached southern hardwood with substantially all debris removed such that the minimum fiber length is greater than about 50 microns.

3. The process of claim 1 wherein the emulsion contains 500 ppm oil, 10% by weight NaCl, and 2500 ppm cellulose.

* * * * *